2,816,571

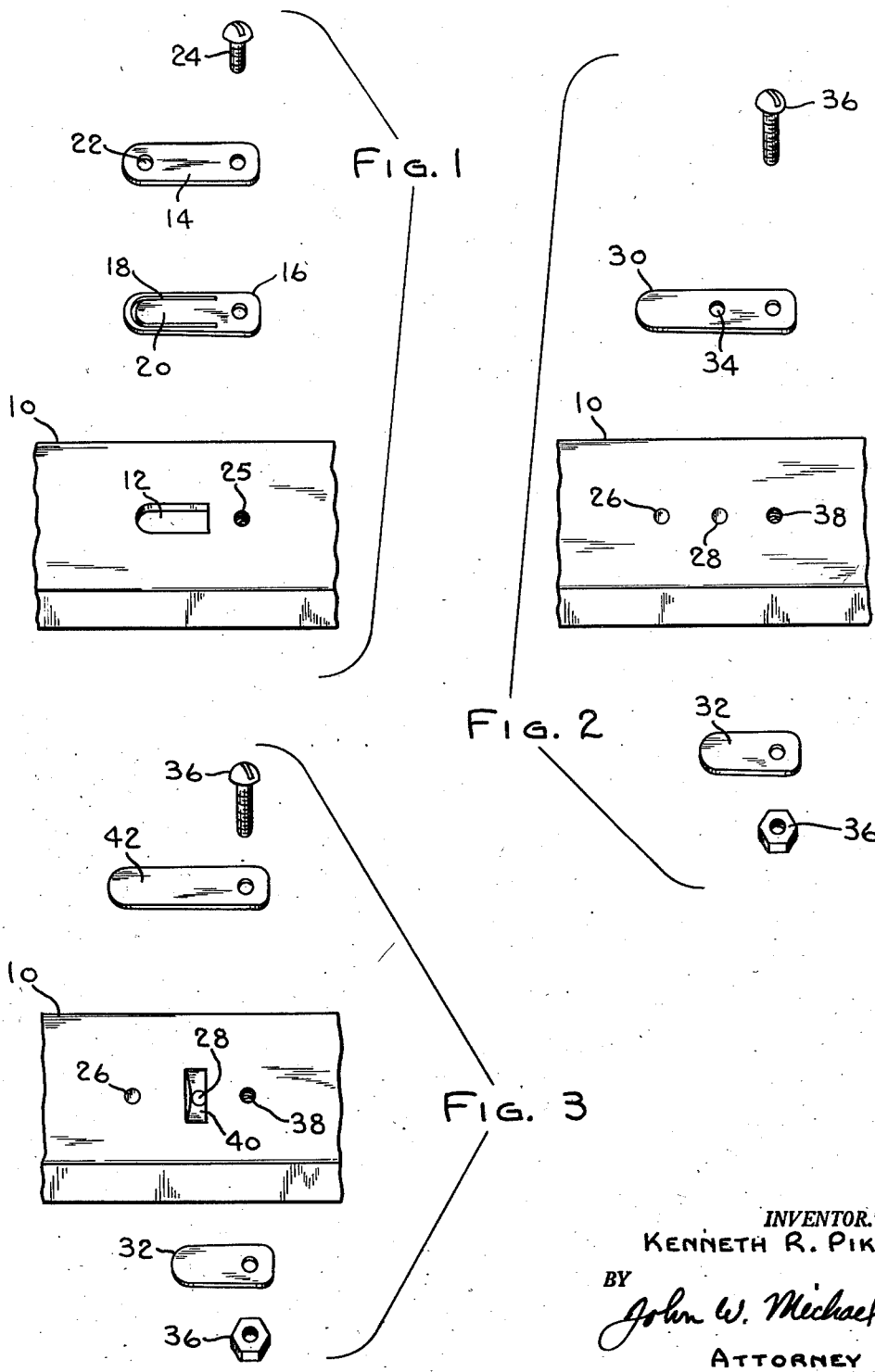
Dec. 17, 1957     K. R. PIKE     2,816,571
RELIEF VALVE
Filed Nov. 12, 1953
INVENTOR.
KENNETH R. PIKE
BY John W. Michael
ATTORNEY United States Patent Office 2,816,571
Patented Dec. 17, 1957

RELIEF VALVE

Kenneth R. Pike, Hartford, Wis., assignor to West Bend Aluminum Co., West Bend, Wis., a corporation of Wisconsin Application November 12, 1953, Serial No. 391,441

1 Claim. (Cl. 137—493.6)

This invention relates to improvements in valves and particularly to combined inlet and relief valves using reeds.

Valves of this type are used for example in liquid pumps or the like where back pressure develops as the carburetor or other receiving device will not take more liquid.

It is an object of this invention to provide a combined inlet and relief valve which is simple and durable in construction and comparatively inexpensive to manufacture.

This object is obtained by using a pair of reeds mounted by a common support to a valve body having an inlet opening. The reed forming the inlet valve opens inwardly while the reed forming the pressure relief or control valve opens outwardly. In one modification both reeds are on the same side of such body. The outlet port is formed in the inlet valve reed and the relief valve reed opens downwardly from such port into the inlet port in the valve body. In another modification the relief port is formed in the valve body adjacent to inlet port and the relief valve reed is on the opposite side of such body from the inlet valve reed.

The invention may be best understood from the following description of specific embodiments when read in connection with the accompanying drawings, in which:

Fig. 1 is an exploded perspective view of a combined inlet and relief valve embodying the present invention;

Fig. 2 is an exploded perspective view of a first modification of a combined inlet and relief valve embodying the present invention; and Fig. 3 is an exploded perspective view of a second modification of a combined inlet and relief valve embodying the present invention.

Referring to the drawings by reference numerals, all modifications of the combined inlet and relief valves are shown mounted on a body 10 which provides support for the reeds and contains the various ports. In the embodiment shown in Fig. 1, the body 10 has an elongated inlet port 12 of sufficient size to accommodate a leaf or tongue in the relief valve. The inlet valve is formed by a reed 14 which is placed in juxtaposition over a reed 16 which forms the relief or pressure control valve. The reed 16 has a U-shaped slot 18 formed therein providing a passage communication with the inlet port 12 and defining a flexible leaf or tongue 20 of sufficient size to freely bend downwardly into the inlet port 12. The reed 14 has an outlet port 22 normally closed by the tongue 20. Both the reed 14 and 16 are secured to the body 10 by a common screw 24 passing through openings in such reeds and threaded into a tapped hole 25.

On the intake, the reed 16 acts as a reed plate for the reed 14. Fluid is drawn upwardly through the inlet port 12 and passage 18 as the inlet valve 14 is flexed upwardly. At the completion of intake, the reed 14 seats on the reed 16 closing passage 18. When back pressure builds up beyond a specified amount, the reed 14 acts as a reed plate for the tongue 20 and such tongue is deflected downwardly into the outlet opening 12 to open the relief port 22 and permit to escape through the outlet opening 12.

In the modification shown in Fig. 2 the body 10 is provided with an inlet port 26 and a relief port 28 adjacent each other. A reed 30 similar to the reed 14 covers the inner end of the inlet port 26. A reed 32 forming a relief valve is positioned on the opposite side of the body 10 and covers the outer end of the relief port 28. The reed 30 has an opening 34 which is alined with the relief port 28. The two reeds are secured to opposite sides of the body 10 by a common bolt and nut 36 which passes through openings in the reeds and an opening 38 in the plate 10. The reed 30 lifts from the opening 26 during intake. When back pressure reaches a specified amount, reed 32 is flexed outwardly, and pressure escapes through the opening 34 and relief port 28.

In the modification shown in Fig. 3 the body 10 has the same inlet port 26 and relief port 28. However, at the top of the relief port there is a passage forming groove 40 which extends beyond the sides of the inlet valve reed. A reed 42 similar to the reed 30 but without the relief opening 34 is mounted on the body 10 to cover the inlet port 26 while leaving the ends of the groove 40 uncovered. Thus back pressure may reach the relief port 28 to flex downwardly the reed 32. Both reeds 42 and 32 are secured in juxtaposition on opposite sides of the body 10 by a common bolt and nut 36.

In all of the modifications the pressure at which the relief valve will function is determined by the physical characteristics of the spring metal in the reeds 16 and 32.

This application is intended to cover such other modifications or changes as come within the spirit of the invention or the scope of the following claim.

I claim:

A combined inlet and relief valve comprising a body having an elongated inlet port, a threaded opening in said body adjacent said port, a first reed fixed on said body and overlying and completely covering said inlet port, said reed having a U-shaped opening therethrough in juxtaposition with said inlet port to define a part of said inlet port, said U-shaped opening defining a flexible tongue carried by said first reed and freely movable downwardly into said elongated inlet port, a second reed in juxtaposition to said first reed and resting upon and normally closing said said U-shaped opening, said second reed having an outlet opening therein normally closed by said tongue, and a single screw passing through both said reeds and threaded into said threaded opening to hold said reeds in proper position.

References Cited in the file of this patent

UNITED STATES PATENTS

| 1,693,888 | Clark | Dec. 4, 1928 |
| 1,890,311 | Blake | Dec. 6, 1932 |
| 2,000,735 | Arnold | Mar. 7, 1935 |

FOREIGN PATENTS

| 466,069 | Canada | June 20, 1950 |